United States Patent [19]

Luise

[11] Patent Number: 5,708,122

[45] Date of Patent: Jan. 13, 1998

[54] LIQUID CRYSTALLINE POLY(ESTER-IMIDES)

[75] Inventor: Robert Ralph Luise, Boothwyn, Pa.

[73] Assignee: E. I. Du Pont de Nemours and Company, Wilmington, Del.

[21] Appl. No.: 636,741

[22] Filed: Apr. 19, 1996

Related U.S. Application Data

[63] Continuation of Ser. No. 311,235, Sep. 23, 1994, abandoned, which is a continuation-in-part of Ser. No. 245,288, May 17, 1994, abandoned.

[51] Int. Cl.[6] .................................................. C08G 73/16
[52] U.S. Cl. .......................... 528/170; 528/171; 528/172; 528/173; 528/183; 528/190; 528/193; 528/194; 528/271; 528/272; 528/274; 528/288; 528/289; 528/290; 528/293; 528/350; 528/353
[58] Field of Search .................................. 528/170, 171, 528/172, 173, 183, 190, 193, 271, 194, 272, 274, 288–290, 293, 350, 353

[56] References Cited

U.S. PATENT DOCUMENTS

| | | | |
|---|---|---|---|
| 4,176,223 | 11/1979 | Irwin | 528/170 |
| 4,383,105 | 5/1983 | Irwin | 528/170 |
| 4,727,129 | 2/1988 | Hisgen et al. | 528/171 |
| 4,728,714 | 3/1988 | Hisgen et al. | 528/183 |
| 5,382,649 | 1/1995 | Horacek | 528/170 |
| 5,391,697 | 2/1995 | Furutani | 528/170 |
| 5,432,248 | 7/1995 | Bonfanti et al. | 528/170 |

FOREIGN PATENT DOCUMENTS 61-238046  10/1986  Japan.

Primary Examiner—P. Hampton-Hightower

[57] ABSTRACT

Poly(ester-imides) containing t-butylhydroquinone and trimellitic anhydride as part of the repeat units, as well as other monomers, are useful as molding resins. The polymers have a high glass transition temperature and are particularly useful in applications requiring good wear resistance.

13 Claims, No Drawings

LIQUID CRYSTALLINE POLY(ESTER-IMIDES)

This is a continuation of application Ser. No. 08/311,235, filed Sep. 23, 1994, now abandoned, which was a continuation-in-part of application Ser. No. 08/245,288, filed May 17, 1994, now abandoned.

BACKGROUND OF THE INVENTION

Thermotropic liquid crystalline polymers are useful for many purposes, particularly as molding resins for making electronic connectors and mechanical parts, such as for automobiles. While there are many known compositions of such polymers, new compositions with desirable property combinations and low costs are constantly being sought.

U.S. Pat. Nos. 4,727,129 and 4,728,714 and Japanese Patent 4-66259 describe thermotropic liquid crystalline polymers which contain only aromatic repeat units, some of these units being derived from trimellitic anhydride and t-butylhydroquinone.

The present invention relates to novel thermotropic liquid crystalline poly(ester-imides) which contain repeat units derived from t-butylhydroquinone and trimellitic anhydride, and other monomers. These polymers are useful as molding resins and, when blended with polytetrafluoroethylene, for wear resistant applications.

SUMMARY OF THE INVENTION

The present invention relates to a liquid crystalline polymer consisting essentially of repeat units of the formulae: one or both of

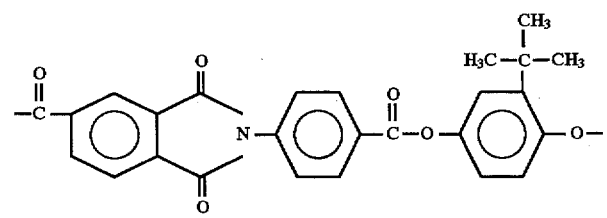

(I)

and

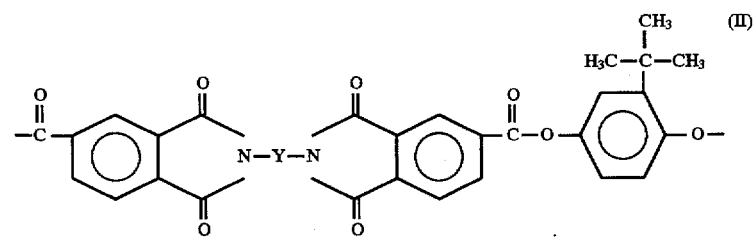

(II)

and optionally one or more of

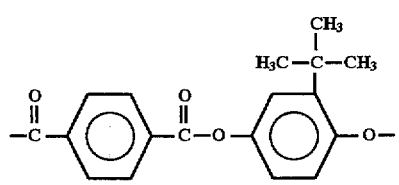

(III)

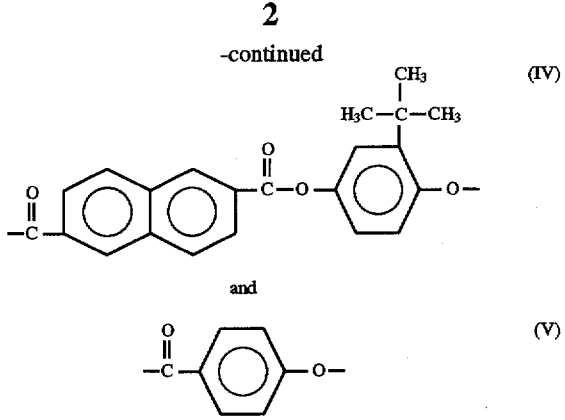

(IV)

and (V)

wherein the mount of (I)+(II) constitutes about 10 to about 30 mole percent of said repeat units; the mount of (III)+(IV)+(V) constitutes from 0 to about 70 mole percent of said repeat units; Y is p-phenylene or

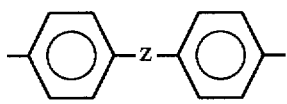

and Z is

DETAILED DESCRIPTION

The liquid crystalline polymers disclosed herein are poly(ester-imides) derived from t-butylhydroquinone (TBHQ), trimellitic anhydride (TMA), and other monomers. Units (I) and (II) include TMA as part (formally) of a dicarboxylic acid monomer containing an imide group which has reacted with TBHQ. Skilled artisans will understand that in all of the units shown above the t-butyl group of the TBHQ may be in either position on the benzene ting (relative to the other parts of the repeat units) to which it is attached. The dicarboxylic acid of (I) can be made by the reaction of TMA with p-aminobenzoic acid, while the dicarboxylic acid of (II) can be made by the reaction of 2 moles of TMA with an appropriate diamine, such as 4,4'-oxydianiline and p-phenylene diamine for example. With the exception of repeat unit (V), which is derived from p-hydroxybenzoic acid (PHBA), all of the other repeat units contain an ester linkage combining the appropriate dicarboxylic acid with TBHQ. In repeat units (III) and (IV) the dicarboxylic acid is terephthalic acid and 2,6-naphthalene dicarboxylic acid, respectively.

In some preferred polymers, repeat units (I) or (II) are 100% of the repeat units. In other preferred polymers only one of units (III), (IV) or (V) is present, and the amount of (I), (II), or (I)+(II), as the case may be, is about 50 to 100 mole percent of the polymer. In preferred polymers, Y is

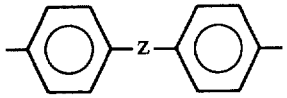

and preferably Z is

In other preferred polymers, repeat units (I) and (II) constitute 100% of the repeat units.

The poly(ester-imides) of the present invention can be made by methods well known in the art. For example, the appropriate dicarboxylic acids, TBHQ and PHBA, if present, are combined to form a polymerization mixture. The hydroxy groups of the TBHQ and PHBA when added to the polymerization mixture can be in the form of lower alkyl esters, such as acetates, or the lower alkyl esters can be formed in situ by reaction with a stoichiometric amount of a lower alkyl carboxylic acid anhydride, such as acetic anhydride. After the acetate has formed, the temperature is raised to condense the monomers to a polymer and to distill off lower carboxylic acid byproduct, such as acetic acid. Usually, towards the end of the polymerization, a vacuum is applied to bring the final polymer to the desired molecular weight or viscosity. Final finishing temperatures are typically about 300° C. to about 360° C. A catalyst, such as potassium acetate, may be added to accelerate the polymerization.

The polymers of the present invention may be mixed with conventional materials for polymer compounding, such as pigments, colorants, antioxidants, flame retardants, lubricants, tougheners, and fillers, including glass, minerals (e.g., clay and talc), carbon black, and carbon fibers. Additionally, the polymers of the present invention may be mixed with other polymers. Persons skilled in the art will understand that the brief list of conventional additives above is merely illustrative and does not specifically name every material which may be mixed with the polymers of the present invention.

The polymers of the present invention are useful as molding resins for electrical connectors, automotive parts, and other uses. They generally have high glass transition temperatures and are especially useful as blends with a tetrafluoroethylene polymer for parts which require good wear properties, such as frictional bearings.

When the polymers of the present invention are blended with a tetrafluoroethylene polymer, the tetrafluoroethylene polymer is a polymer wherein about 90% or more of the repeat units therein are derived from tetrafluoroethylene, i.e. has the structure

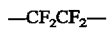

It is preferred that any other comonomer in the tetrafluoroethylene polymer be perfluorinated. An especially preferred tetrafluoroethylene polymer is the homopolymer of tetrafluoroethylene (i.e., polytetrafluoroethylene (PTFE)).

Tetrafluoroethylene polymer is commercially available in various grades. The tetrafluoroethylene polymer can be in the form of micropowder, granules, or fibers. If used in the form of fibers, it is preferred that the fiber length be small, preferably 0.4 mm or less, and the fiber is less than 10 denier/filament. If the tetrafluoroethylene polymer is PTFE, various grades, such as granular and powder, may be used. Powder is preferred. Manufacturers of PTFE have particular grades that are recommended for use in blends where wear resistance is important and those grades are suitable for blending with liquid crystalline polymers of the present invention.

It is preferred that blends with a tetrafluoroethylene polymer contain about 3 to about 50 weight percent, more preferably about 10 to about 40 weight percent, and most preferably about 20 to about 35 weight percent of the tetrafluoroethylene polymer, based on the total weight of the poly(ester-imide) and the tetrafluoroethylene polymer.

EXAMPLES

In the Examples, the following abbreviations are used:

"AA"—acetic anhydride

"DSC"—differential scanning calorimetry

"HM"—heat of melting, in J/g

"2,6-N"—2,6-naphthalene dicarboxylic acid

"T"—terephthalic acid

"$T_g$"—glass transition temperature

"$T_m$"—melting point

"TMB"—a dicarboxylic acid having the structure

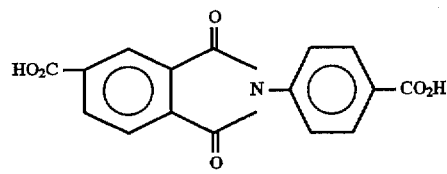

"TMO"—a dicarboxylic acid having the structure

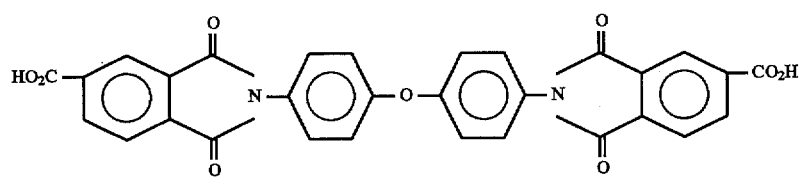

EXPERIMENT 1

Preparation of TMB

Two hundred grams of trimellitic anhydride and 145 g of p-aminobenzoic acid and 1 liter of N,N-dimethylformamide ("DMF") were added to a 2 liter, four-neck, round bottom flask. A condenser, mechanical stirrer, and thermometer were attached to the flask and the flask contents were stirred and heated by an electric heating mantle. The contents were stirred and heated for 4.5 hours, and then the solution was allowed to cool to room temperature. One liter of methanol was then added with stirring, which was continued for 5 minutes. The resulting precipitate, which was a mixture of solid and liquid, was then filtered using a Buchner funnel, and the solid was washed with 1 liter of methanol. Two liters of distilled water were then heated to boiling in a 4 liter beaker and the washed solid was added with stirring, which was continued for 5 min. The resulting mixture was then filtered using a Buchner funnel, and again the solid was washed with 1 liter of methanol. The solid product was dried in a vacuum oven with a nitrogen bleed at about 170° C. for about 18 hrs.

EXPERIMENT 2

Preparation of TMO

Two hundred ninety-nine grams of trimellitic anhydride were dissolved in 500 ml of DMF in a four-neck, round bottom flask equipped with a calcium sulfate drying tower, mechanical stirrer, thermometer, reflux condenser, and a graduated addition funnel. The anhydride solution was heated to 50° C. A solution of 4-aminophenylether (150 g) in 350 ml of DMF was added dropwise for about 1 hr to the anhydride solution via an addition funnel. Afterwards, the resulting solution was heated to reflux for 3 hrs, then allowed to cool to room temperature. One liter of methanol was added to the reaction contents and the product was recovered by filtration under reduced pressure. The recovered yellow solid was stirred in 2 liters of boiling water for several minutes, filtered under reduced pressure, and washed again with 1 liter of methanol. The solid product was dried in a vacuum oven with a nitrogen purge at about 100° C. for about 24 hrs. The product had a DSC $T_m$ of 380° C., and no unreacted anhydride or partially reacted amide-acids were detected.

EXAMPLES 1-7

All the polymers for Examples 1-7 were made by the same basic procedure. The polymerization ingredients, listed in Table 1, were added to a resin kettle which was equipped with a stirrer and was heated by a liquid metal bath under nitrogen,. The bath was heated to reflux at about 170° C. The reflux was done for one hour, after which acetic acid was distilled off as the temperature of the metal bath was gradually raised to about 310° C. over a period of approximately 2.5 hrs. The temperature was slowly raised to about 350° C. to 360° C. and the pressure was then slowly lowered over a period of 1 to 2 hrs until it reached about 133–1330 Pa. While the pressure was lowered the metal bath was held at 350° C. to 360° C. The temperature was maintained at low pressure until the desired viscosity (measured by the current draw of the stirrer motor) was reached. This took up to 4 hrs. Afterwards, stirring was stopped and the polymer was removed from the resin kettle. A DSC analysis was done after the polymer cooled.

Ingredients used to make the polymer for each Example, together with polymer properties, are found in Table 1.

In the examples, $T_g$ and $T_m$ were measured by DSC at a heating rate of 25° C./min. The $T_g$ and $T_m$ reported were those of the first heat of the polymer. The $T_g$ was taken as the midpoint of the transition, and the $T_m$ was taken as the maximum of the melting endotherm.

EXAMPLES 8 AND 9

In Examples 8 and 9, blends of poly(ester-imides) and polytetrafluoroethylene were made and tested for wear resistance. In Example 8 the poly(ester-imide) of Example 1 was used, and in Example 9 the poly(ester-imides) of Examples 4 and 5, which were identical, were combined and used.

The polytetrafluoroethylene used in Examples 8 and 9 was Teflon® micropowder MP1500 PTFE (available from E. I. du Pont de Nemours and Company) having an average particle size of 20 microns and recommended for lubrication and wear resistance purposes. It is hereinafter referred to as MP1500.

The procedure below was followed in preparing the LCP-PTFE blends of Examples 8 and 9.

Dried pelletized LCP was blended with MP1500 to obtain a blend containing 70 weight percent LCP and 30 weight percent MP 1500. The blend was melt mixed in a Werner-Pfleiderer 28 mm twin screw extruder equipped with standard mixing screws, a vacuum adapter attached to the mixing zone, and a 4.8 mm diameter circular die. The barrel and die temperatures were set at an appropriate temperature (i.e. above the $T_g$ and $T_m$ of the LCP in the blend), the screws at 150 rpm, and the blend was extruded at a rate of 5.8 kg/hr. The blend was pelletized, dried, and then injection molded on a 170 g injection molding machine using a barrel temperature setting above the $T_g$ and $T_m$ of the LCP used in the blend and a mold temperature setting of 100° C. The blends were molded into flex bars, 3.2 mm thick, per ASTM D790.

For wear testing, "pins", 6.35 mm square (oy 3.2 mm thick), were cut from the center edge of a flex bar. Three pins were mounted on a 3.18 cm outer diameter circular holder, spaced 120° apart, with the original longitudinal axis of the flex bar oriented tangentially to the 2.38 cm mean diameter mounting circle. The pins were loaded axially at pressure P against a 3.18 cm outer diameter and 1.59 cm inner diameter steel washer made of American Iron and Steel Institute 1018 carbon steel and finished to a 0.40 mm (AA) roughness. The washer was rotated at velocity V, measured at the mean diameter (2.38 cm) of the washer. The temperature of the washer could be measured and this temperature was considered to be the temperature of the surface of the LCP-PTFE blend.

Wear data is summarized in Table 2, below. The higher the pressure (P) and/or velocity (V), the more severe the test and the wear are likely to be. K is volumetric wear rate divided by PV and is reported herein in units of $(cm^2/kg) \times 10^8$. The lower the value of K, the better is the wearing of the blend. Also shown in Table 2 is the washer temperature (W. Temp.) in °C. Both of the blends of Examples 8 and 9 exhibited excellent wear resistance.

TABLE 1

| | | | TMB | | TMO | | T | | 2,6N | | PHBA | | Properties | | |
|---|---|---|---|---|---|---|---|---|---|---|---|---|---|---|---|
| Ex. No. | AA gm | TBHQ gm | gm | mole % | gm | mole % | gm | mole % | gm | mole % | gm | mole % | $T_g$ °C | $T_m$ °C | HM |
| 1 | 238.3 | 188.4 | 352.7 | 100 | — | — | — | — | — | — | — | — | 226 | 328 | 2.4 |
| 2[a] | 342.1 | 270.4 | 253.1 | 50 | — | — | 135.1 | 50 | — | — | — | — | 217 | 336 | 4.1 |
| 3[a] | 366.9 | 290.0 | — | — | 478.0 | 50 | 144.9 | 50 | — | — | — | — | 189 | 230 | 1.0 |
| 4[b] | 263.6 | 208.3 | — | — | 686.8 | 100 | — | — | — | — | — | — | 201 | 315[d] | 2.0 |
| 5[a] | 263.6 | 208.3 | — | — | 686.6 | 100 | — | — | — | — | — | — | 203 | 316[e] | 2.8 |
| 6[c] | 348.9 | 275.8 | — | — | 454.6 | 50 | — | — | 179.4 | 50 | — | — | 187 | 232 | 1.2 |
| 7 | 477.5 | 251.6 | 471.1 | 50 | — | — | — | — | — | — | 209.1 | 50 | 211 | 364 | 4.6 |

[a]100 ppm potassium acetate used as a catalyst in Ex. 2, 3, and 5.
[b]The run started solidifying at 282° C. bath temp. and melted at 330° C.
[c]The run started solidifying at 254° C. bath temp. and melted at 289° C.
[d]Endotherm peak at 401° C. believed to be a clearing temperature.
[e]Endotherm peak at 397° C. believed to be a clearing temperature.

TABLE 2

| Example | P (MPa) | V (M/Min) | K | W. Temp. (°C.) |
|---|---|---|---|---|
| 8 | 2.76 | 53.3 | 16.4 | 167 |
|   | 2.76 | 61.0 | 1276 | 196 |
| 9 | 2.76 | 53.3 | 27.6 | 166 |
|   | 2.76 | 61.0 | 18.9 | 146 |

What is claimed is:

1. A liquid crystalline polymer consisting essentially of repeat units of one or both of

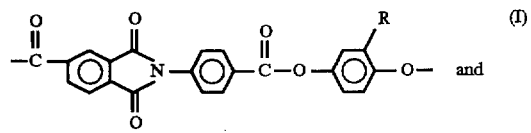 (I)

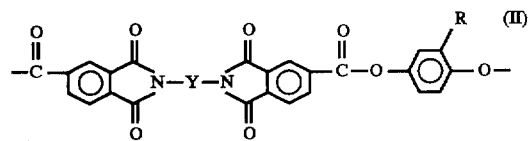 (II)

and optionally one or more of

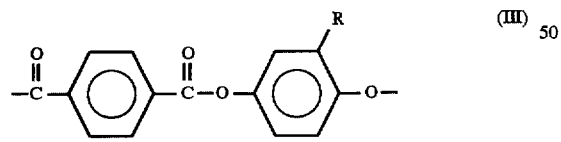 (III)

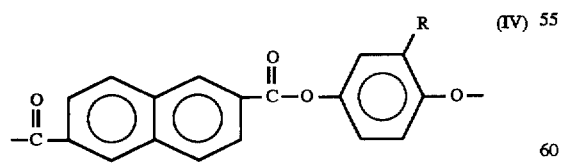 (IV)

and

 (V)

wherein (I)+(II) is about 30–100 mole percent of the repeat units; (III)+(IV)+(V) are 0 to about 70 mole percent of said repeat units; Y is p-phenylene or

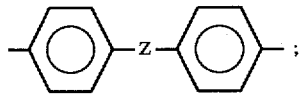 ;

R is t-butyl; and
Z is

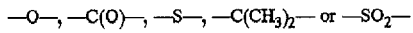

with the proviso that when (I) is present, at least one of (III), (IV) or (V) is present.

2. The liquid crystalline polymer of claim 1 wherein 100 mole percent of said repeat units is (II).

3. The liquid crystalline polymer of claim 1 wherein one of (III), (IV) or (V) is present.

4. The liquid crystalline polymer of claim 1 wherein (II) is about 50 to 100 mole percent of said repeat units.

5. The liquid crystalline polymer of claim 1 wherein (I) or (II) is at least about 50 mole percent of said repeat units.

6. The liquid crystalline polymer of claim 1 wherein the repeat units consist essentially of (I) or (II), and one or both of (III) and (IV).

7. The liquid crystalline polymer of claim 1 wherein Y is

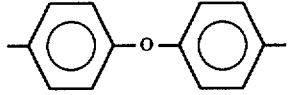

8. The liquid crystalline polymer of claim 3 wherein Y is

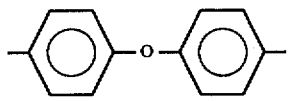

9. The liquid crystalline polymer of claim 5 wherein Y is

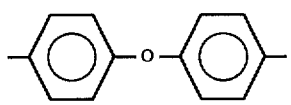

10. The liquid crystalline polymer of claim 1 blended with polytetrafluoroethylene.

11. The liquid crystalline polymer of claim 10 wherein said polytetrafluoroethylene is about 10 to about 50 percent by weight of the total weight of the blend of said liquid crystalline polymer and said polytetrafluoroethylene.

12. The liquid crystalline polymer of claim 1 wherein (I) is present and one of (III), (IV) or (V) is present.

13. The liquid crystalline polymer of claim 12 wherein (III), (IV) or (V) is about 50 mole percent of the repeat units.

* * * * *